United States Patent [19]

Tesson

[11] 4,218,158
[45] Aug. 19, 1980

[54] PIPE HANDLING METHOD AND APPARATUS

[76] Inventor: Prosper A. Tesson, 11942 Summerdale, Houston, Tex. 77079

[21] Appl. No.: 842,237

[22] Filed: Oct. 14, 1977

[51] Int. Cl.² .......................... B23P 19/04; F16L 1/00
[52] U.S. Cl. .................................. 405/170; 405/154; 405/158
[58] Field of Search ................. 61/105, 106, 107, 108, 61/110, 111, 109, 112, 72.7

[56] References Cited

U.S. PATENT DOCUMENTS

| | | | |
|---|---|---|---|
| 3,204,417 | 9/1965 | Robley | 61/111 |
| 3,267,682 | 8/1966 | Robley . | |
| 3,578,233 | 5/1971 | Meister | 61/111 X |
| 3,657,786 | 4/1972 | Wiswell . | |
| 3,711,938 | 1/1973 | Warren et al. | 61/110 X |
| 3,732,701 | 5/1973 | Lynch | 405/162 |
| 3,765,185 | 10/1973 | Peck et al. . | |
| 3,780,421 | 12/1973 | White et al. | 61/111 X |
| 3,785,160 | 1/1974 | Banjavich et al. | 61/111 |
| 3,844,129 | 10/1974 | Finlay . | |
| 4,014,180 | 3/1977 | Kelly et al. | 405/170 |
| 4,028,903 | 6/1977 | Dietrich | 61/110 |
| 4,109,480 | 8/1978 | Sumner | 405/170 |

FOREIGN PATENT DOCUMENTS 1372743  8/1964  France ................... 405/163

Primary Examiner—Dennis L. Taylor
Attorney, Agent, or Firm—Vinson & Elkins

[57] ABSTRACT

A mobile pipe handling frame useful for building and repairing subsea pipelines is disclosed and includes a vertically adjustable beam and horizontally adjustable sled thereon which may be utilized for suspending a hydraulic pipe clamp for grasping and moving pipe sections vertically and horizontally. The sled and beam may also be utilized for supporting and positioning one end of a stabber beam which, with its other end resting upon the pipeline, may be utilized to telescope tubular coupling members onto the end of the pipeline. The pipe handling frame and hydraulic pipe clamp also may be used to "walk" a pipe section, or one end of a pipeline, across the ocean floor transversely to the longitudinal axis of the pipeline. A method for utilizing the pipe handling frame, hydraulic pipe clamp and stabber beam for repairing damaged subsea pipelines and for completing subsea pipeline connections to risers are disclosed.

This abstract is not to be construed in any way to define or limit the invention set forth below.

18 Claims, 32 Drawing Figures

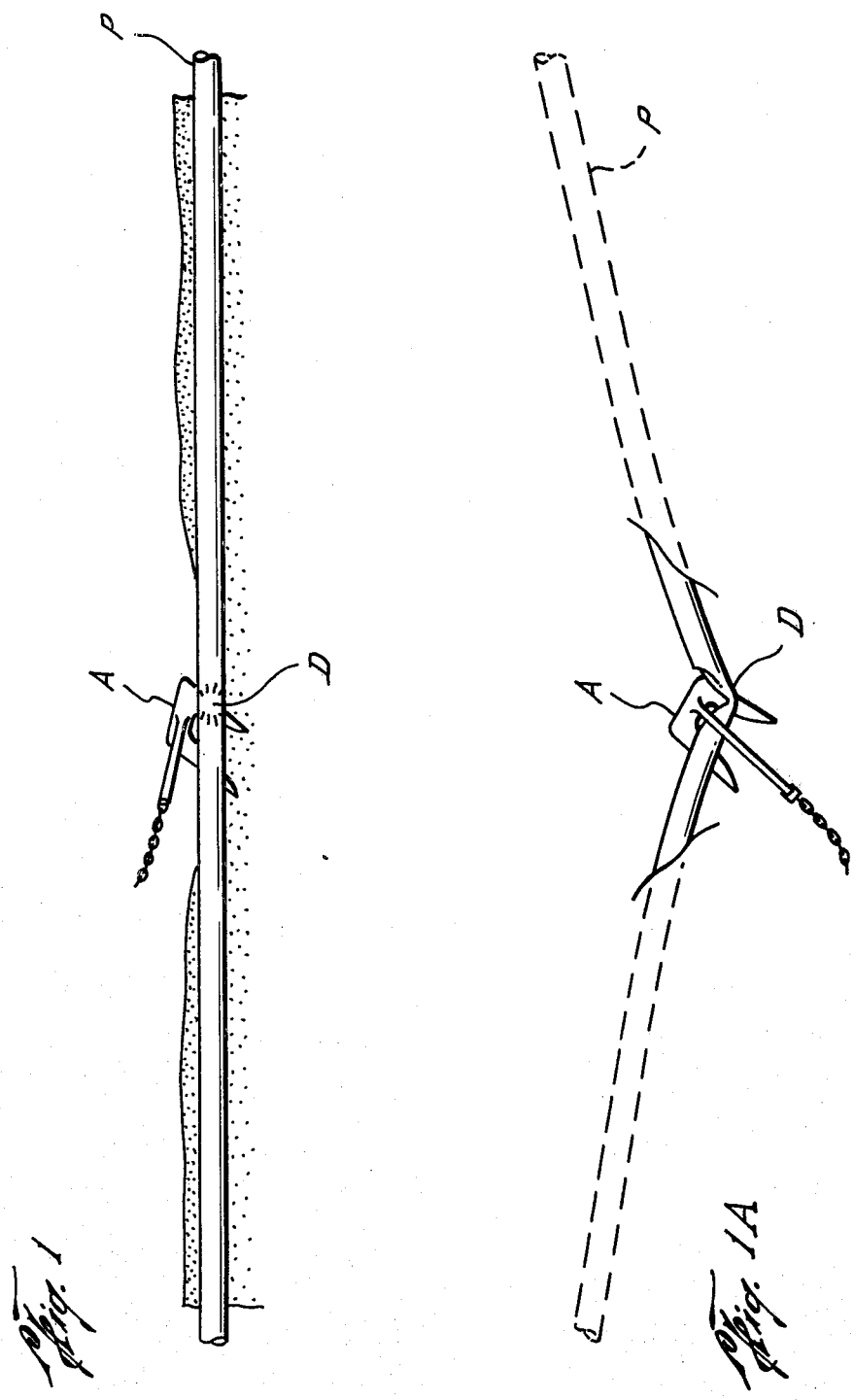

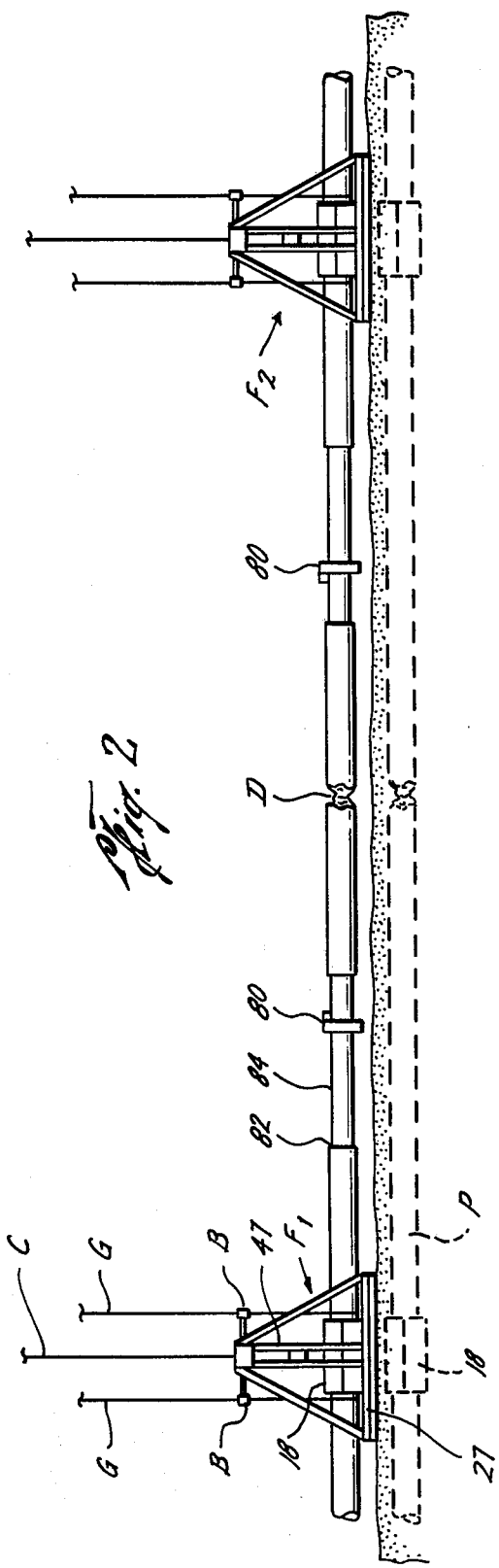

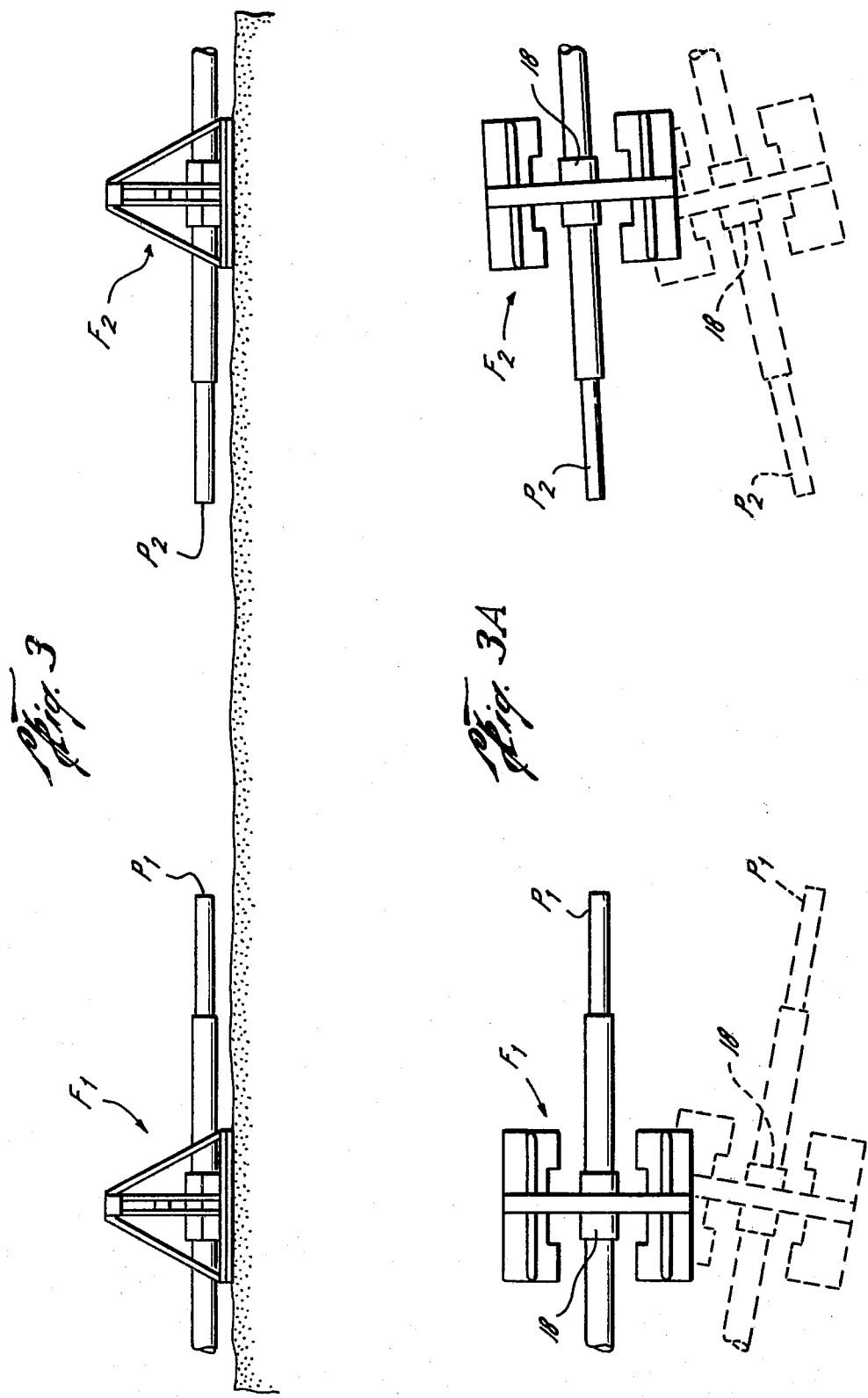

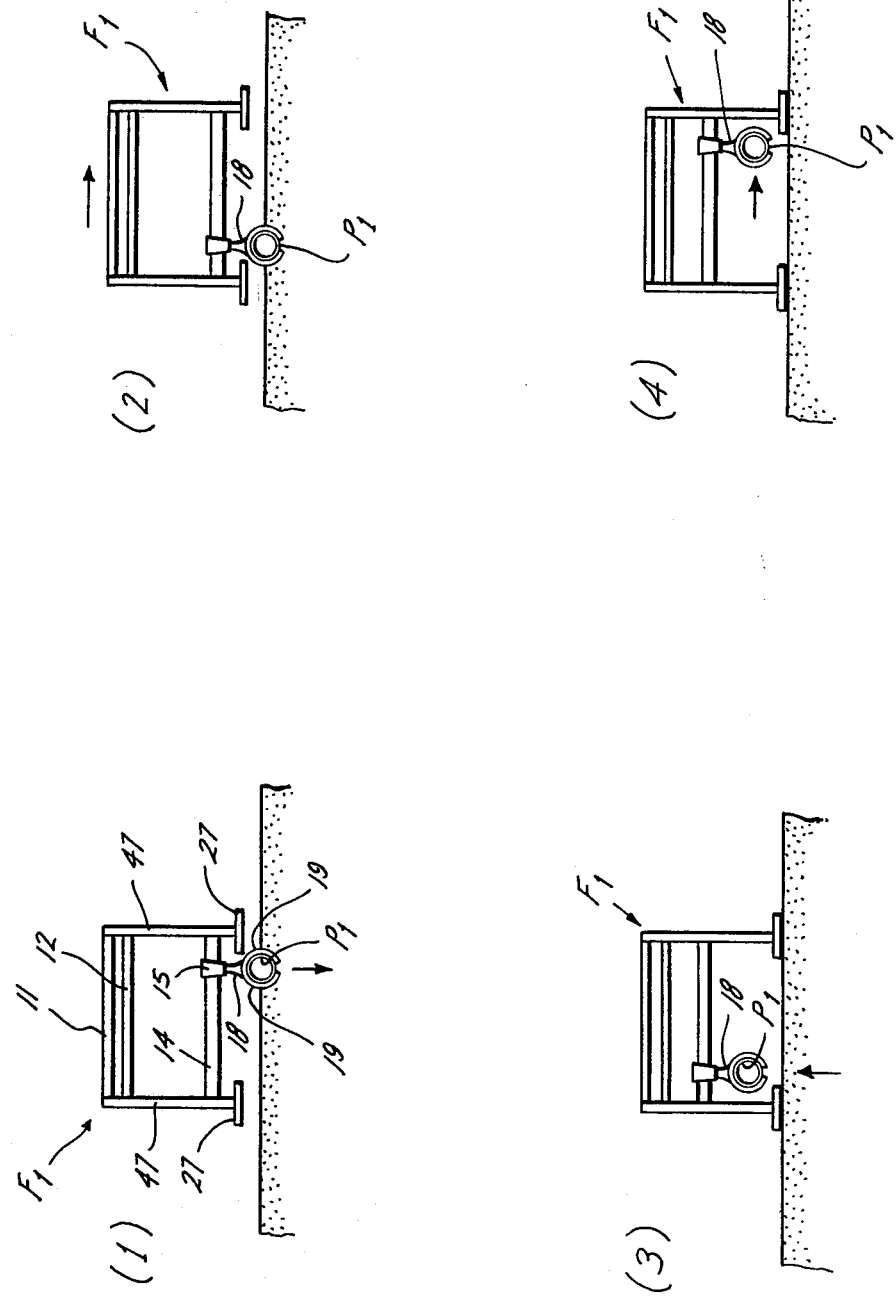

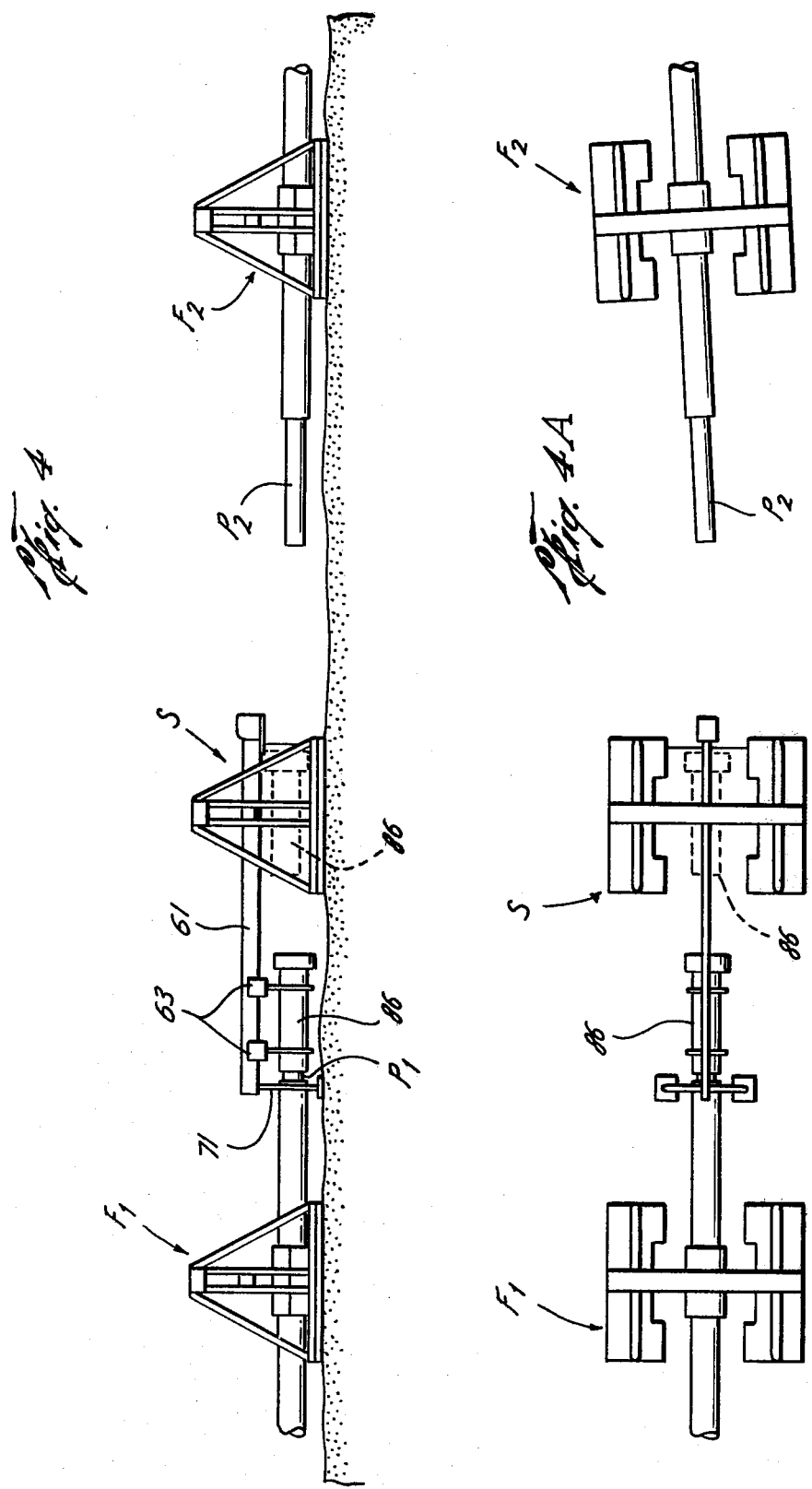

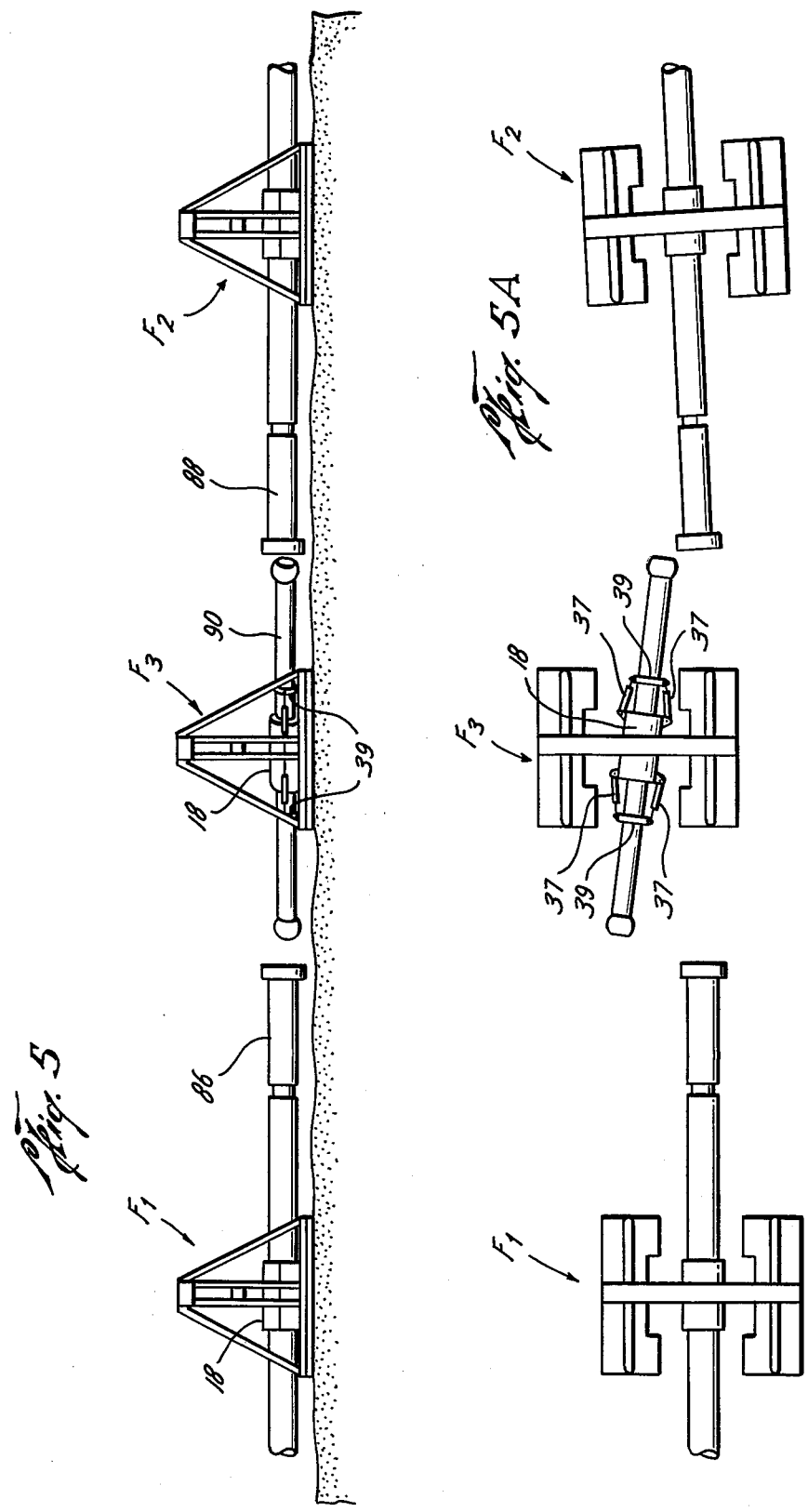

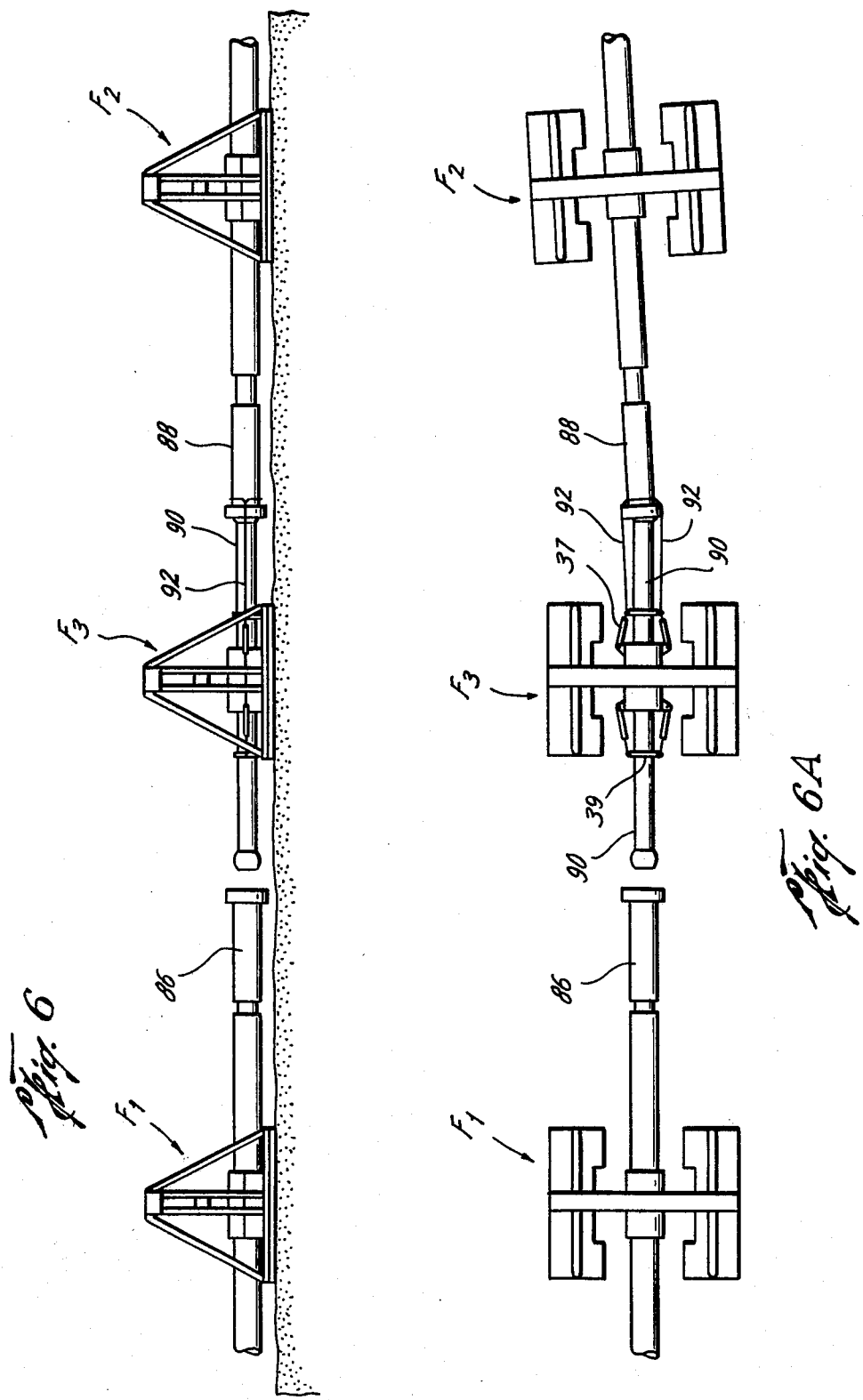

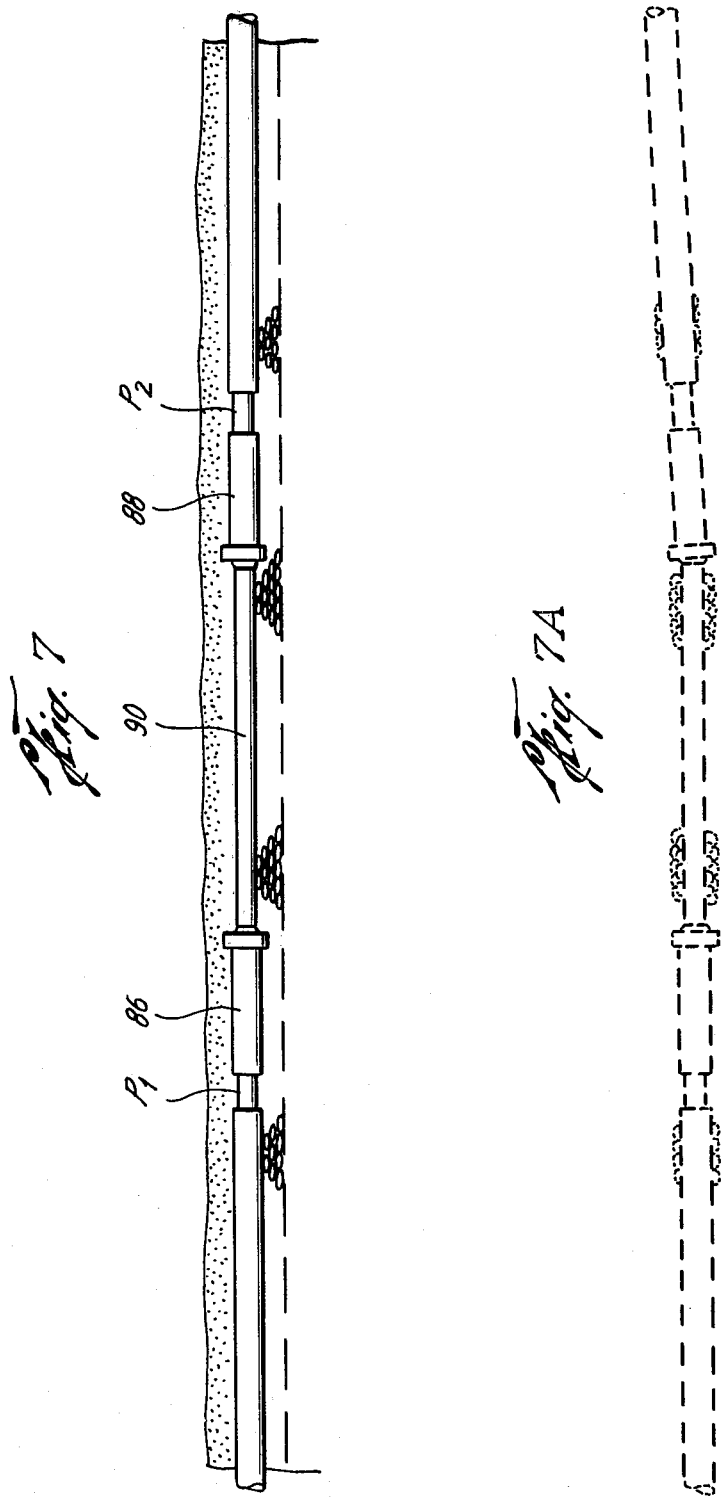

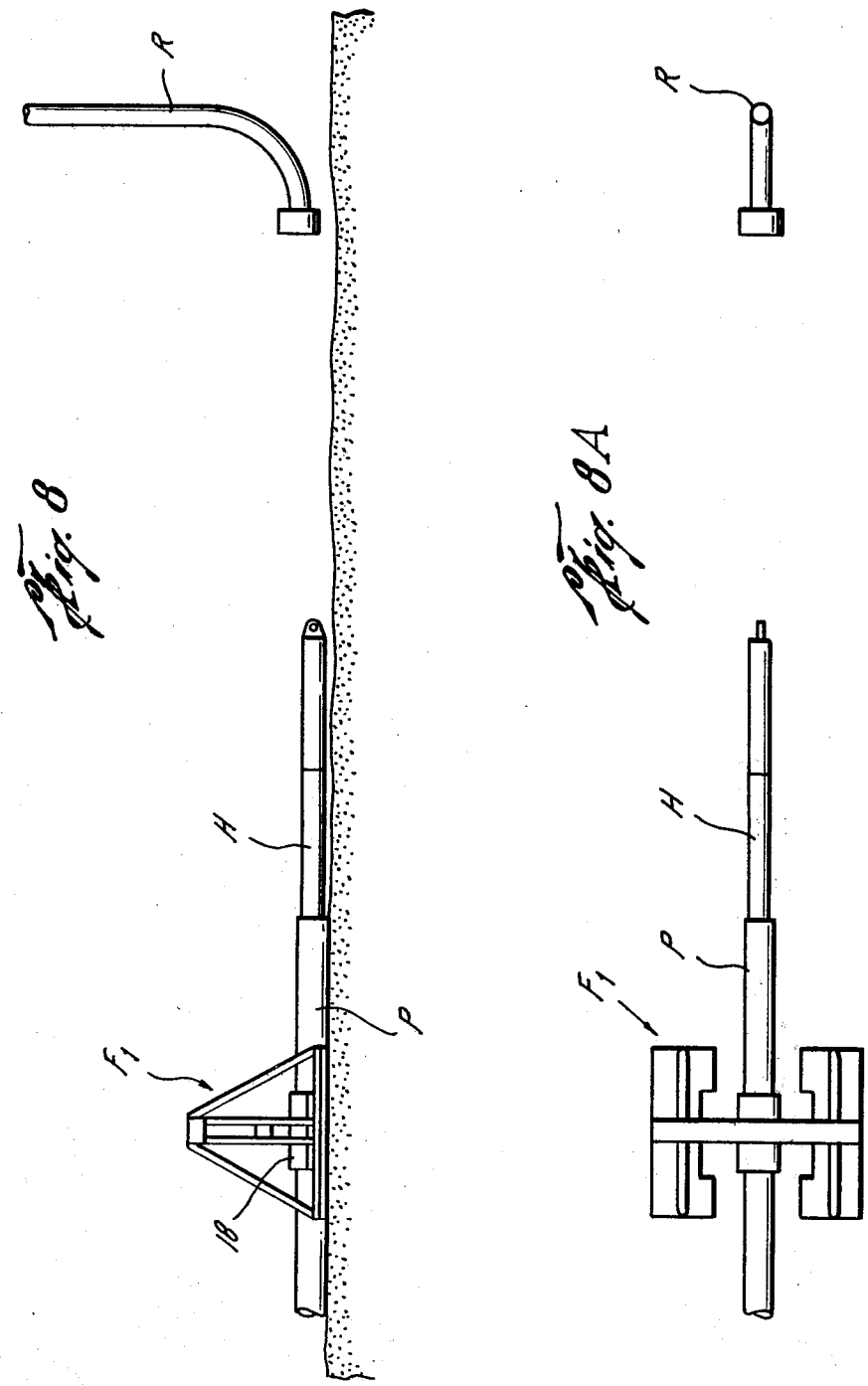

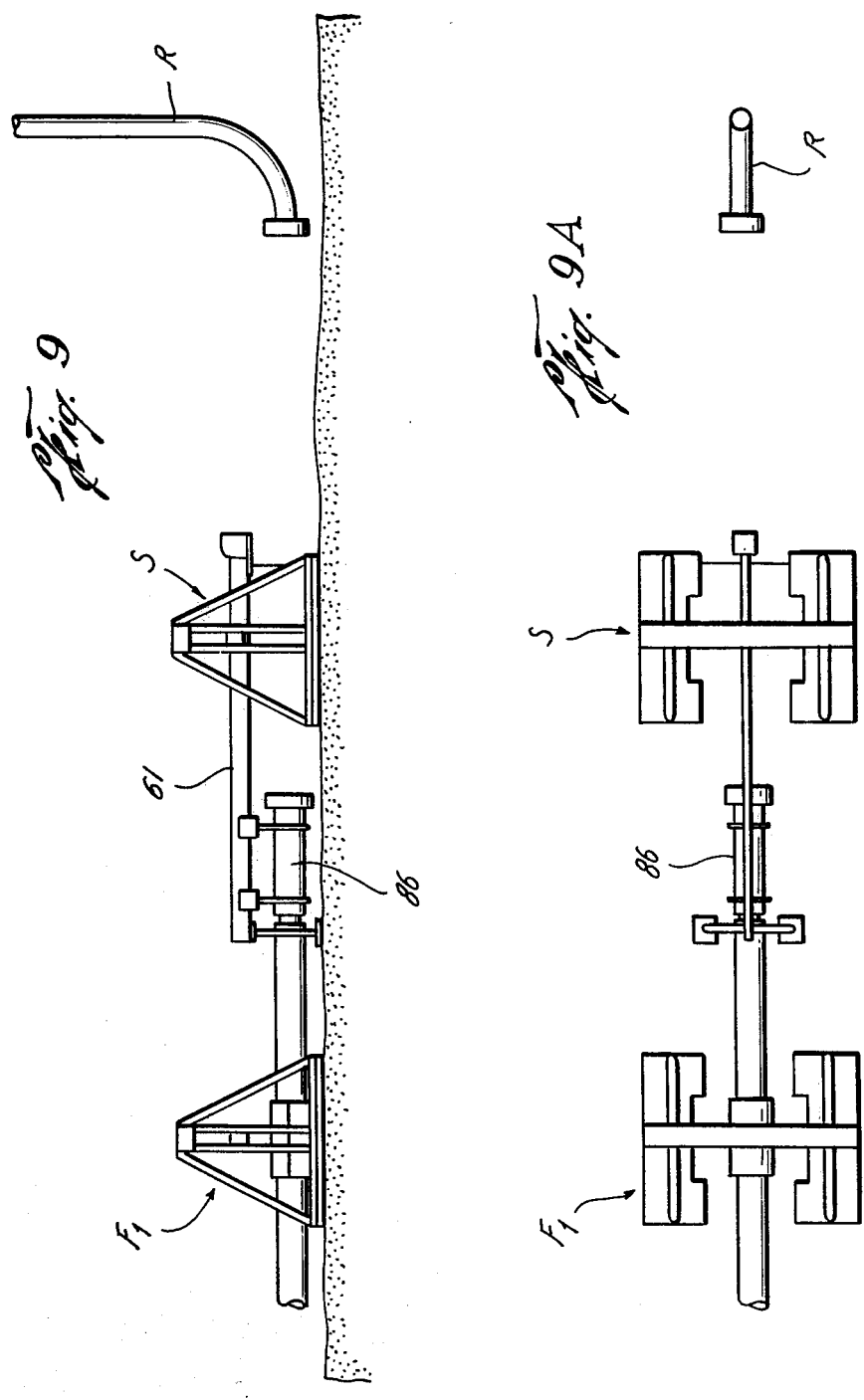

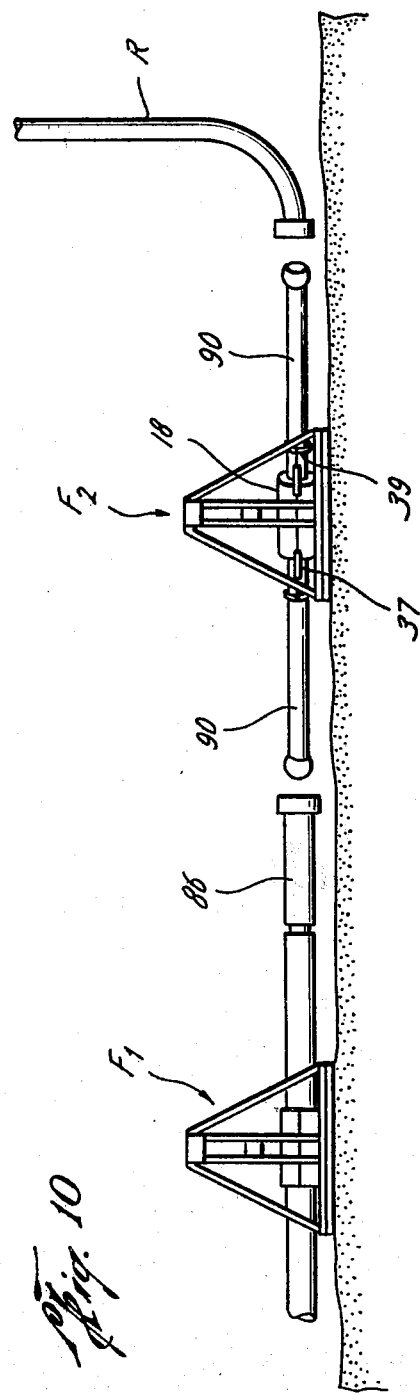
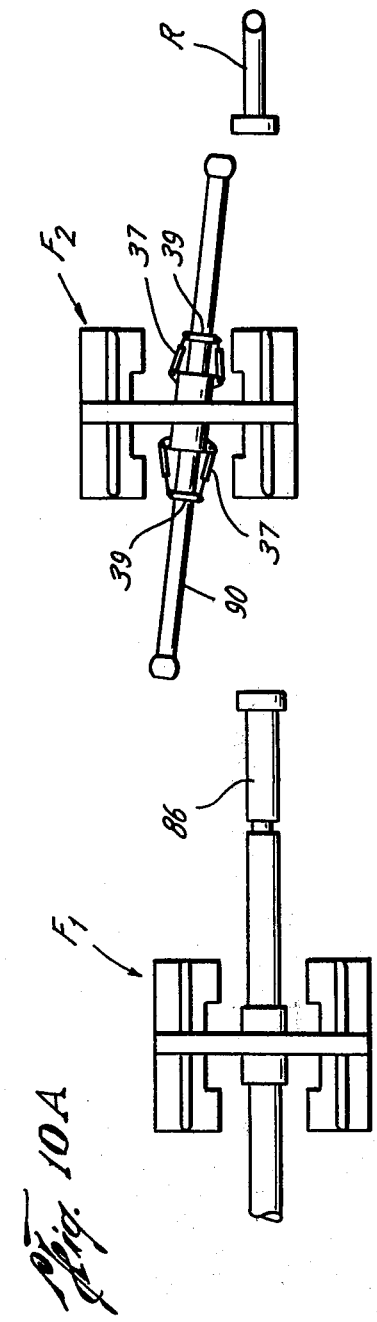

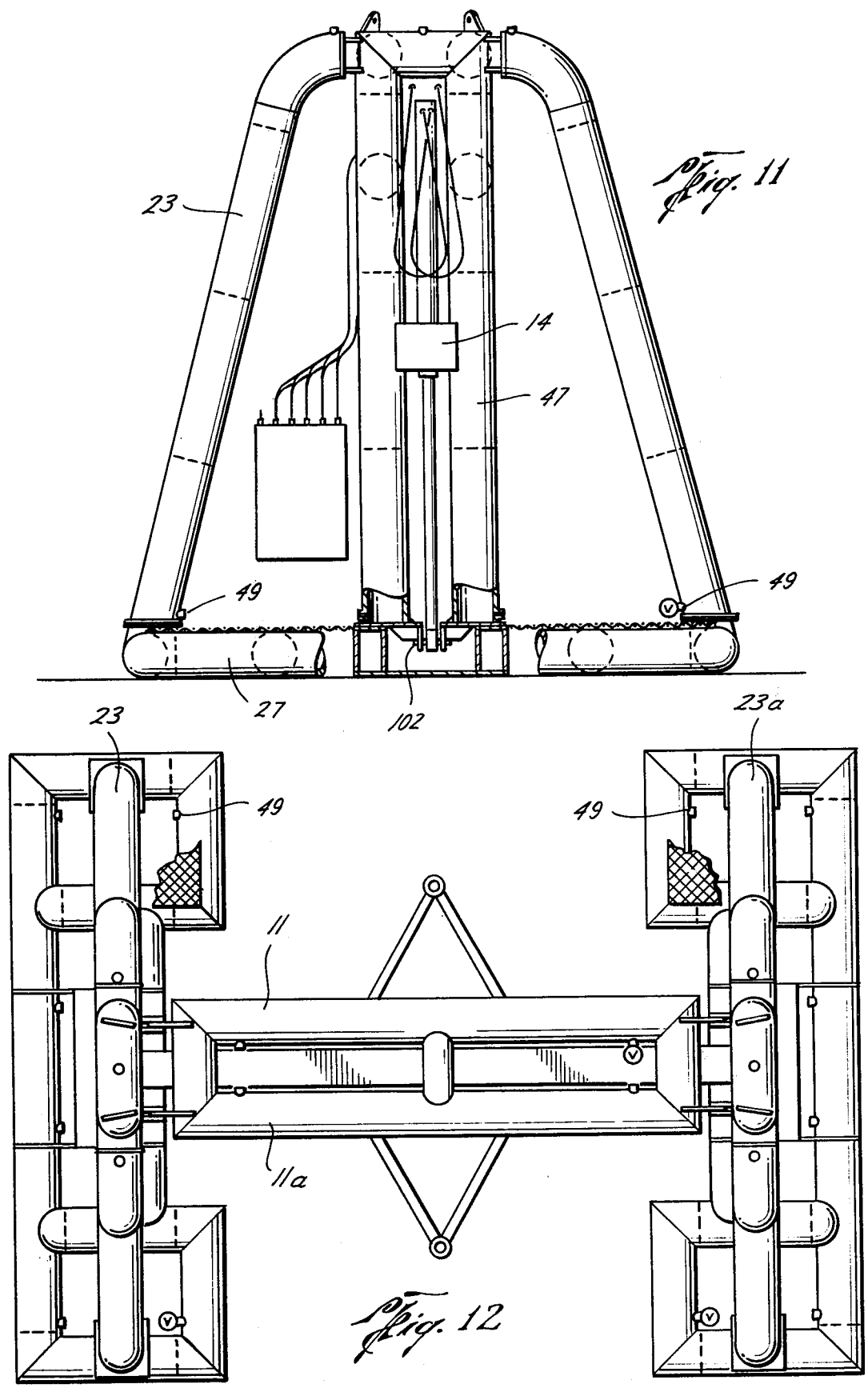

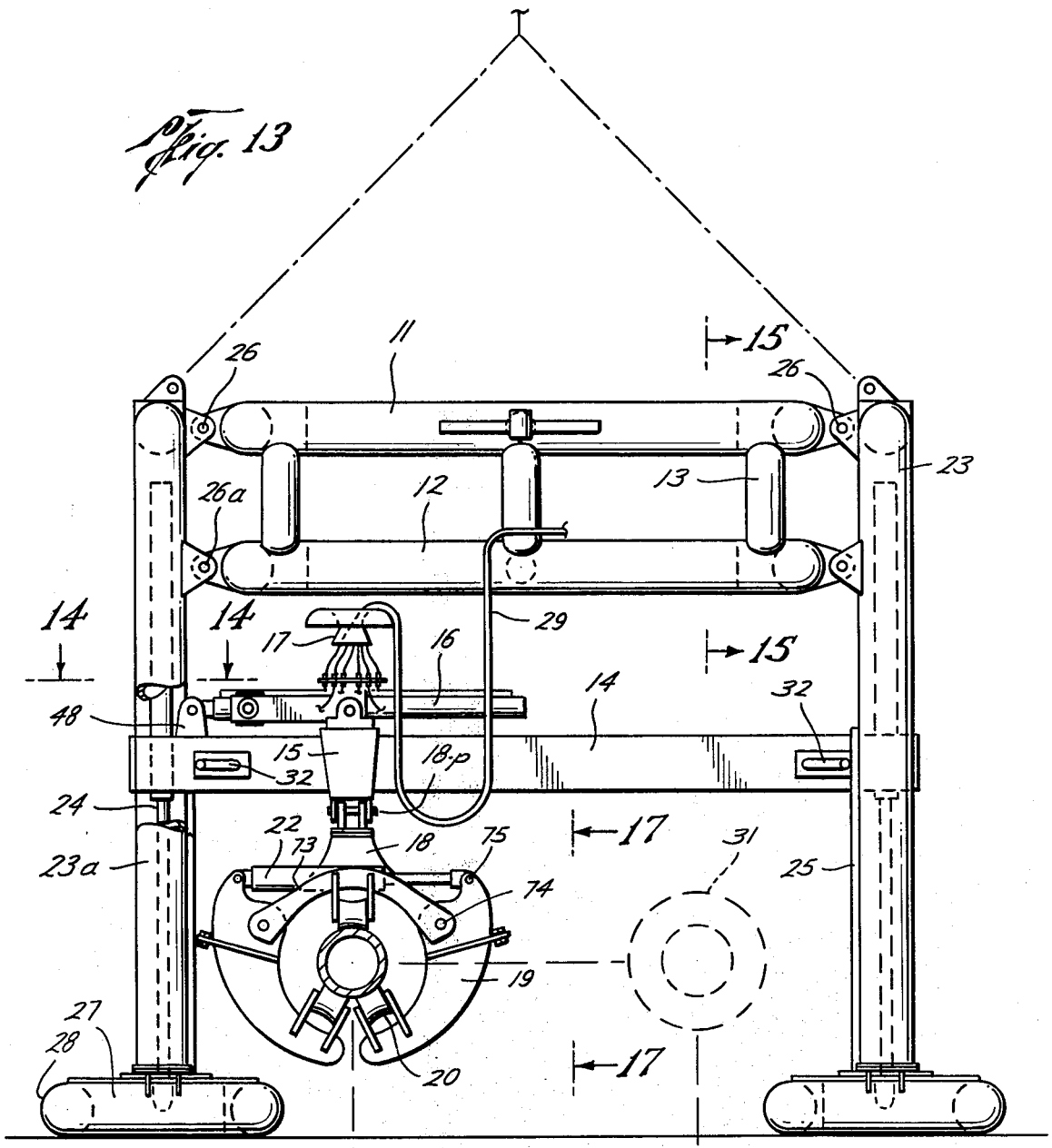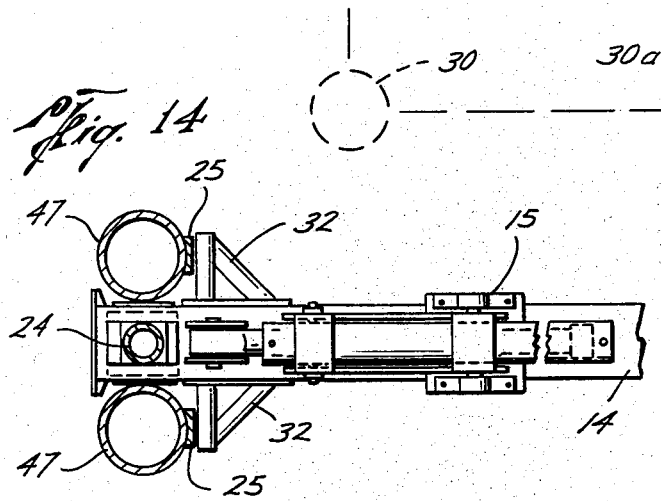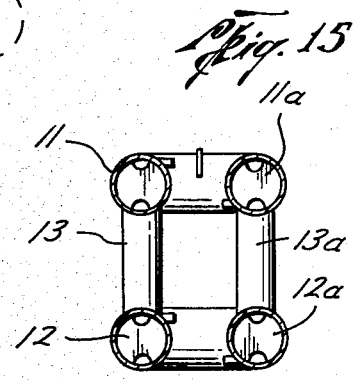

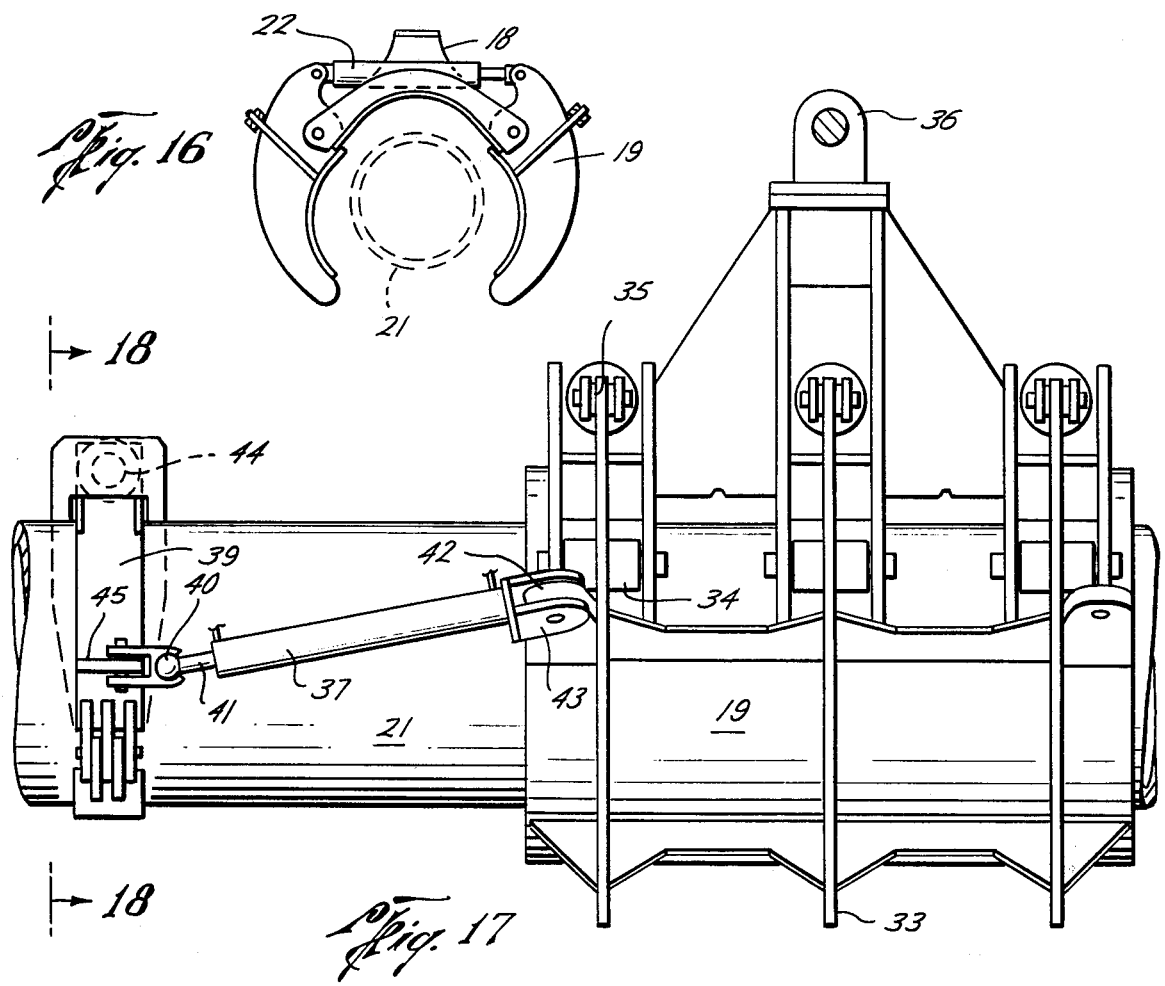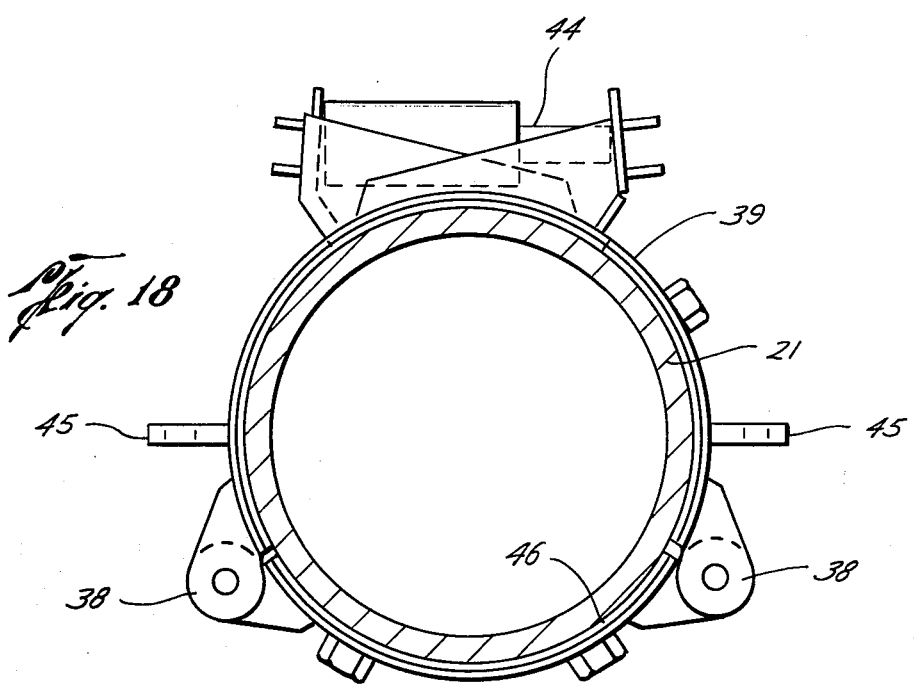

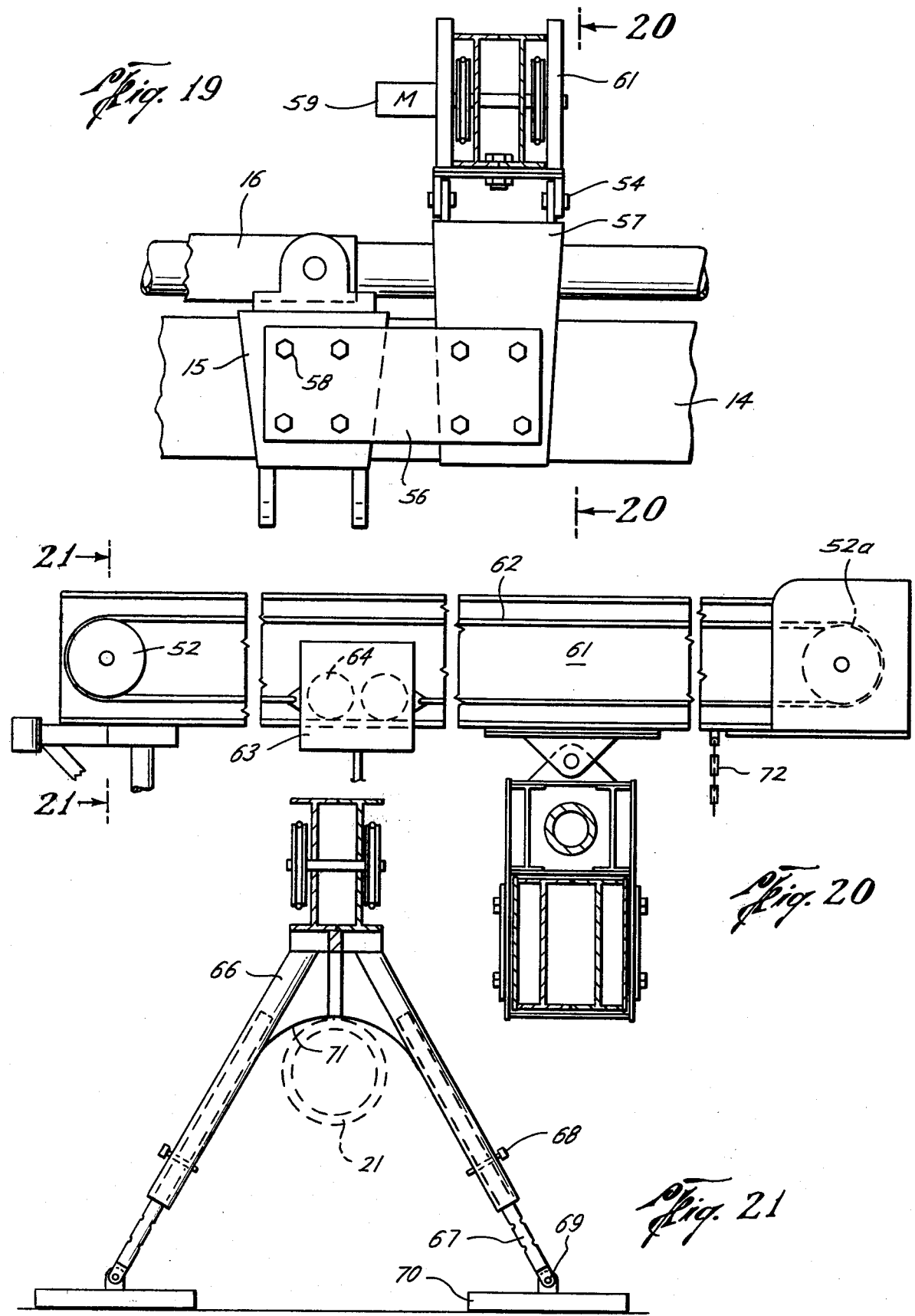

PIPE HANDLING METHOD AND APPARATUS

BACKGROUND OF THE INVENTION

The present invention relates to methods and apparatus for building, completing, repairing and performing similar operations on subsea pipelines, particularly those of large diameter.

The building and repairing of large diameter subsea pipelines, and the completion and connection of such pipelines to marine risers has been extremely tedious, cumbersome and expensive, primarily because of the individual pipe sections, connectors and other components of the pipeline system are large, and extremely heavy. A single section of 36 inch diameter steel pipe with a cement weight coating may weigh ten tons or more, so that manual positioning by divers is rendered impossible.

In the past, these operations have typically been carried out using pipe slings and cables supported from cranes carried by surface vessels to support the pipe sections and utilizing numerous divers to hand position the pipe sections held by the cranes. Such operations are, of course, adversely affected by weather conditions or rough water at the surface. In the North Sea, and similar areas plagued by bad weather, this method has been rendered nearly infeasible.

Past attempts at utilizing subsea cranes, pipe frames and the like for handling these components have met with only partial success, due to their inability to operate satisfactorily on the rough terrain encountered on the ocean floor and due to their inability to lift and reposition the enormous loads encountered with the required accuracy.

In repairing damaged subsea pipelines of large diameter, a further particular problem is encountered where the anchor, ship or other cause of the damage has deflected the pipeline from its normal course, so that after removal of the damages portion, the pipeline ends may not be rejoined using commercially available linear components. In some instances, connecting sections have been custom fabricated to rejoin the misaligned pipe sections, relying upon a diver's measurements and estimates in fabricating the connection, with attendant difficulties. In other instances, repositioning of the pipeline sections in linear relationship has been attempted, but this generally requires the use of surface cranes or derricks, no subsea apparatus having previously been available which can accurately reposition the pipeline ends and carry out the successive steps of installing tubular connections to rejoin the ends.

OBJECTS OF THE INVENTION

It is accordingly the primary object of the present invention to provide subsea pipe handling apparatus which overcomes the disadvantages of the prior art; which is capable of operating in a subsea environment wholly independently from surface vessels, except for a connecting umbilical cord to provide power (such as hydraulic, pneumatic and/or electrical power); which is capable of lifting and positioning very heavy loads with extreme accuracy and which may be utilized on rough, sloping or uneven subsea terrain.

A further object is to provide such apparatus which may be operated, directly or remotely, by a single diver, to position and join pipe sections weighing ten tons or more.

Another object is to provide such an apparatus which may be utilized to lift and "walk" misaligned pipe sections into desired alignment and then to join the aligned portions.

Another object is to provide a pipe handling apparatus which is lowered into position in an integral unit, requiring no subsea assembly, but which may, as desired, be broken apart for convenient shipment by conventional sea, air or ground transport.

A further object is to provide such an apparatus which contains integral buoyancy tanks which may be deballasted to minimize the weight of the apparatus in water (while being raised, lowered and positioned) and which may then be selectively ballasted on the ocean floor to increase the weight and stability of the apparatus.

A further object is to provide such apparatus which includes pipe clamp means capable of gripping and raising pipe sections buried beneath the ocean floor and lying in ditches, trenches, or the like.

DESCRIPTION OF THE DRAWINGS

These and other objects and advantages of the invention will be apparent from the following specification, drawings and claims. In the accompanying drawings, in which like numerals indicate like parts:

FIGS. 1 and 1-A are views respectively in elevation and plan illustrating a subsea pipeline damaged by a ship's anchor;

FIGS. 2 and 2-A are views respectively in elevation and plan illustrating the same pipeline lifted into working position above the ocean floor by two of the pipe handling frames of the present invention and illustrating how the damaged portion of the pipe may be cut away for removal;

FIGS. 3 and 3-A are views respectively in elevation and plan showing the same pipeline after removal of the damaged portion and illustrating how the pipe handling frame of the present invention may be used to walk the two deflected end portions of the pipeline back into alignment;

FIG. 3-B is a diagrammatic illustration of the four sequenced operations performed by the pipe handling frame in accomplishing each step of "walking" the pipeline back into alignment, as illustrated in FIG. 3-A;

FIGS. 4 and 4-A are views respectively in elevation and plan showing a pipe handling frame including a horizontal stabber beam being used to install a telescoping tubular coupling member on one end of the pipeline;

FIGS. 5 and 5-A are views respectively in elevation and plan showing a pipe handling frame according to the present invention being used to install a tubular connector between the two ends of the pipeline which have been fitted with coupling members;

FIGS. 6 and 6-A are views respectively in elevation and plan showing how push-pull cylinders on the pipe handling frame may be used to join the tubular couplers with the tubular connecting member to complete repair of the pipeline;

FIGS. 7 and 7-A are views respectively in elevation and plan illustrating the repaired pipeline;

FIGS. 8 and 8-A are views respectively in elevation and plan illustrating the pipe handling frame of the present invention being used to support the forward end of a subsea pipeline as it nears completion with a marine riser;

FIGS. 9 and 9-A are views respectively in elevation and plan illustrating a pipe handling frame with a stabber beam being used to install a tubular coupling member on the forward end of the pipeline;

FIGS. 10 and 10-A are views respectively in elevation and plan showing a pipe handling frame being used to install a connector between the marine riser and the coupling member on the forward end of the pipeline;

FIG. 11 is a side elevation (partially cut away) of a preferred embodiment of the pipe handling frame according to the present invention;

FIG. 12 is a plan or top view of the frame of FIG. 11, illustrating the footing arrangement in relation to the frame;

FIG. 13 is a front elevational view of the preferred pipe handling frame of FIG. 11;

FIG. 14 is an enlarged, fragmentary, top cross-sectional view, taken along the section line 14—14 of FIG. 13;

FIG. 15 is an elevational, cross-sectional view, taken along the section line 15—15 of FIG. 13 and illustrating details of the cross-header member of the pipe handling frame;

FIG. 16 is a front, elevational view of the pipe clamp of FIG. 11 in an open position;

FIG. 17 is an enlarged side elevational view of the pipe clamp of FIG. 16 and illustrating the friction clamp and push-pull cylinders used in connection with the pipe clamp;

FIG. 18 is an enlarged front, elevational view, partly in cross-section taken along the section line 17—17 of FIG. 16 and illustrating the friction clamp and pipe being held therein in greater detail;

FIG. 19 is an enlarged detailed view in front elevation and partly in section showing the attachment of the stabber beam to the pipe clamp sled on the traveling beam;

FIG. 20 is a side elevational view partly in cross-section taken along line 20—20 of FIG. 19;

FIG. 21 is a front, elevational view of the stabber beam and its support means mounted on the pipeline section.

DESCRIPTION OF THE METHOD

Referring now to FIGS. 1 through 8-A, there is illustrated somewhat diagrammatically the method by which apparatus according to the present invention may be utilized to repair a damages pipeline P buried in the ocean floor. As illustrated, the pipeline has been damaged by a ship's anchor A dragging across, bending and rupturing the pipeline at D. The repair of such damage requires removal of the damaged portion D of the line, realignment of the two undamaged ends of the line and finally replacement of the removed damaged portion to re-connect the ends and provide a continuous fluid conduit. This may be advantageously accomplished using the mobile subsea pipe handling apparatus according to the present invention.

In effecting a repair, a first mobile pipe handling frame F-1 is lowered from a ship or barge on the surface into a position over the buried pipeline P and spaced from one side of the damaged portion D.

The pipe handling frames of the present invention, including their construction and operation, are described in greater detail hereinafter. But for purposes of explaining generally their method of use, a simplified description will suffice. As illustrated in plan and side elevation in FIGS. 2 and 2-A, and in end elevation in FIG. 3-B, (and utilizing the parts numerals of the more detailed description hereinbelow) the pipe handling frames comprise generally a rigid inverted U-shaped frame including two pairs of vertical side legs 47 joined across the top by cross header beams 11 and 12 supported on each side by a sled base or footing 27. Inclined supports join the legs and base for further strength and rigidity and comprise a part of the overall frame.

In the preferred embodiment, the structural members comprising the legs, cross-header beams, sled base and braces are formed of hollow tubular stock suitably closed at the ends to form water tight compartments which may be selectively flooded with sea water as ballast to increase the weight of the frame as desired during working operations, or deballasted by blowing the sea water out with compressed air to reduce the weight of the frames in water while they are being lowered to or raised from the ocean floor, or while being moved from one position to another on the ocean floor.

Extending between and guided by the vertical side legs is a horizontal traveling beam 14 which is adjustable vertically with respect to the remainder of the frame by means of a pair of hydraulic cylinders or rams, one cylinder supporting each side of the horizontal traveling beam. The cylinders are preferably independently adjustable to permit the traveling beam to be maintained approximately horizontal even though the two sled bases for the pipe frame are at different elevations, due to uneven terrain.

Riding on the horizontal traveling beam is a pipe clamp support means or sled 15 which is adjustable horizontally across the width of the traveling beam 14 between the side legs 47 by means of a double-acting hydraulic cylinder. A rolling trolley or other means could also be used in place of the sliding sled 15.

Suspended from the sled 15 is a hydraulic pipe clamp 18 with a pair of jaws 19 that may be selectively operated by means of hydraulic cylinders to engage the clamp about the outer surface of a pipe section or similar cylindrical member. In the preferred embodiment, the parts of the pipe frame and clamp are so dimensioned and configured that the clamp 18 in its lowest position extends below the base sleds 27 of the pipe handling frame so that it may be used to grasp a pipe buried in a shallow trench or ditch below the surface on which the pipe frame is resting, and then raise it into a working position above such surface.

As shown in FIG. 2, the pipe handling frame F-1 with a hydraulic clamp 18 thereon may be lowered from a surface vessel by a wireline or cable C until it rests on the ocean floor in a position over and astride the buried pipeline P and spaced from one side of the damaged portion D. The pipe handling frame may be conveniently guided into position by means of guide lines G which are attached to the pipeline by a diver and then through guide brackets B on the pipe frame and attached to the surface vessel. If the guidelines G are maintained taut while lowering the pipe frame, it will be seated automatically in the proper position. Once positioned, the guide lines and, if desired the lowering cable C may be removed and the pipe handling frame F-1 operated independently of the surface ship except for an umbilical line (not shown) used to supply power for the hydraulic operations. In the remainder of the method description and drawings, the lowering cables C, guide cables G and cable guide brackets B on the pipe frames are omitted for simplicity.

Preferably, during the lowering and positioning of the pipe handling frame about the pipe P, the frame is fully deballasted so as to minimize its weight in water and make it easier to lower into position. Once positioned astride the pipeline P, the pipe frame may be ballasted by flooding with sea water in order to adjust its weight for stability and the like.

In like manner, a second pipe handling frame F-2 with a pipe clamp 18 thereon is lowered from the surface and into position astride the pipeline and spaced from the other side of the damaged portion D.

Once the pipe handling frames are suitably positioned, the pipe clamps 18 are adjusted horizontally on the traveling beams 14 to a position directly above the pipeline, the jaws are opened and the clamps are lowered, by means of the hydraulic cylinders supporting the horizontal traveling beam 14 until they are in position to grasp the buried pipeline (illustrated in dotted lines in FIG. 2). The pipe clamps are then engaged about the pipeline and raised so as to raise the damaged portion of the pipeline into a working position above the ocean floor (solid lines, FIG. 2). This done, the damaged portion D of the pipeline may be removed by cutting it away using conventional means such as hydraulic pipe cutters 80. Preferably, before the hydraulic pipe cutters are utilized to sever the damaged portion of the pipe, a portion of the pipe coating 82 is cleared away as illustrated at 84 to allow the hydraulic pipe cutters to directly contact the surface of the pipe. As explained more fully hereinafter, it is preferable to remove the pipe coating for a sufficient distance back from the cut to allow the installation of tubular coupling members which telescope over the pipe ends and are used to make the mechanical repair in the pipe.

Illustrated in phantom line in FIG. 3-A is the pipeline as it appears after the damaged portions have been cut out and removed and the pipe coating stripped back, leaving first and second ends $P_1$ and $P_2$ of the pipeline spaced laterally from each other and supported by the pipe clamps 18 of the first and second pipe handling frames F-1 and F-2. In order to properly effect repair of the pipeline, it is preferable to realign the first and second ends of the pipeline so that when reconnected, they will again form an approximately straight line. As illustrated somewhat diagrammatically in FIG. 3-B, this may be accomplished using the pipe handling frames of the present invention to "walk" each end of the pipeline from its misaligned position back to its original position in alignment with the other end.

The sequence includes lowering the hydraulic pipe clamp 18 relative to the remainder ot the pipe handling frame F-1 until the end $P_1$ of the pipeline carried by the clamp is resting on the ocean floor and the pipe handling frame is substantially free from the ocean floor [FIG. 3-B(1)]. Next, the pipe handling clamp is adjusted laterally relative to the remainder of the frame, by means of moving the sled 15 suspending the pipe clamp laterally along the horizontal traveling beam 14. Since the pipe handling clamp and pipeline end are resting on the ocean floor, while the remainder of the pipe handling frame is relatively free from engagement with the ocean floor, this movement will cause the pipe frame to move laterally in the desired direction relative to the longitudinal axis of the pipeline [FIG. 3-B(2)]. The pipe clamp and pipe are then raised relative to the pipe handling frame until the pipe handling frame is again resting on the ocean floor and the pipe clamp 18 and end $P_1$ of the pipeline carried thereby are substantially clear of the ocean floor. Finally, to complete the sequence, the pipe clamp is adjusted laterally with respect to the pipe handling frame to thereby cause the end of the pipeline carried by the pipe clamp to move laterally in the desired direction with respect to the longitudinal axis of the pipeline [FIG. 3-B(4)].

The net effect of the sequence is thus to move the free end of the pipeline laterally for a distance approximately equal to the distance which the pipe clamp may be moved between the legs 47 of the pipe handling frame. The sequence is then repeated until the end of the pipe has been positioned as desired.

Once the two ends $P_1$ and $P_2$ of the pipeline are properly aligned, a pipe stabber frame S, having a pipe stabber beam 61 thereon is lowered into position between the two ends of the pipeline. This pipe handling frame S is the same as the first two pipe handling frames F, and $F_2$, except that the hydraulic pipe clamp is removed and instead an elongated pipe stabber beam 61 is supported from the sled 15 on the horizontal traveling beam 14. The stabber beam 61 extends generally perpendicular to the horizontal traveling beam 14 and parallel to the longitudinal axis of the pipeline P.

One end of the stabber beam is supported by the sled 15 for vertical and horizontal adjustment therewith. The other end is supported by a guide or saddle 71 which rests on the upper surface of the pipeline so as to properly align the end of the stabber beam with the pipe. Suitable adjustment of the horizontal and vertical position of the other end carried by the pipe stabber frame S will then produce alignment of the longitudinal axis of the pipeline.

The stabber beam is used to install a telescoping tubular coupling member 86 on the end of the pipeline. The coupler is lowered to the ocean floor carried by the pipe stabber frame S, as illustrated in phantom lines in FIGS. 4 and 4-A. Installation is accomplished by means of trolleys 63 which roll along the stabber beam 61, supporting the coupler 86 until it is telescoped onto the exposed end of the pipeline where the coating has been previously removed.

The telescoping tubular coupler 86, used for mechanical repair of the pipeline is commercially available for a variety of pipe sizes from such companies as HydroTech Systems, Inc; Cameron Iron Works, Inc; Gray Tool Company, and others. As is well known to those skilled in the art, the tubular coupling 86 telescopes over the free end $P_1$ of the pipeline with relatively close tolerances (about $\frac{3}{8}$ inch) and once in place, is sealably engaged with the outer surface of the pipe by means of internal packing elements and slips (not shown) designed to automatically seal the annulus between the coupler and the pipe.

After the first tubular coupler in place, the pipe stabber frame S and stabber beam are then typically returned to the surface for a second tubular coupling 88 which is releasably attached to the pipe frame S, lowered into position, and aligned and engaged with the other end $P_2$ of the pipeline in exactly the same manner as was the first coupler. Alternative procedures could, of course, be used for repositioning the frame S and stabber beam 61 and supplying a second coupler 88, which would not involve returning the frame S to the surface for receipt of the coupler 88.

With both of the tubular couplers 86 and 88 in place, the pipe stabber frame S with the stabber beam 61 is removed and a third pipe frame F-3 with a pipe clamp 18 thereon is lowered into position carrying a tubular connector 90 which is adapted to mechanically and sealably engage the first and second tubular couplers 86 and 88 to provide the final connecting link for the pipeline. The tubular connector 90 also has engaged about it two friction clamps 39 connected to the pipe clamp 18 by means of push-pull cylinders 37. The friction clamps and push-pull cylinders are used to push or pull the tubular connector through the pipe clamp in order to aid in its positioning. As explained more fully hereinafter, this operation is aided by the provision of rollers, or other friction reducing means, between the pipe clamp 18 and the tubular connector 90.

Once the tubular connector has been properly aligned between the two ends of the pipeline, the first and second tubular couplers 86 and 88 are sealably engaged with the corresponding ends of the connector 90 to complete the repair. As illustrated in FIGS. 6 and 6-A, the connection may be accomplished by using a cable 92 or similar connection extending from the tubular coupling member to the friction clamp 39 on the tubular connector, so that the push-pull cylinders 37 may pull the coupling member 88 into engagement with the tubular connector 90. This same operation is then repeated with the other coupler until the repair has been fully made. During this operation, the friction clamps 39 are released from engagement with the tubular connector 90.

When the repair is completed, the pipeline may then be appropriately braced or supported as illustrated in FIG. 7, after which all three hydraulic pipe clamps are released and the pipe frames are removed to the surface. If the pipe frames had been ballasted by flooding with sea water during their operations, the ballast would be blown out with compressed air prior to removal of the pipe frames so as to make them lighter during removal operations. Earth fill may be placed over the repair to help prevent future damage.

FIGS. 8 through 10 illustrate the method by which the apparatus of the present invention may be utilized to connect a pipeline to a marine riser extending upwardly from the ocean floor to a production platform, shore installations, or the like.

The operation is substantially similar to the repair procedure described above, except that here the undamaged forward end of the pipeline P is to be joined to a marine riser R already in place. As illustrated the pipeline has attached to it a pulling head H which must be removed and a coupling member installed in its place. The riser is illustrated with a coupling member 94 already in place; however, should one not be present, it could of course, be installed as described above.

In making the connection, a first deballasted mobile pipe handling frame F-1 with a hydraulic pipe clamp 18 thereon is lowered into a position over the pipeline and spaced rearwardly from the forward end thereof. Once in place, the pipe frame may be ballasted to increase its weight and stability. The pipe clamp 18 is utilized to grasp the pipeline and raise its forward end into a working position above the ocean floor. Alignment of the forward end of the pipeline P with the riser R, if required, may then be accomplished by "walking" the pipe frame and pipeline into the desired position as described above.

After removal of the pulling head H (if present) a stabber frame S with a stabber beam 61 thereon is lowered into position carrying a tubular coupling member 86. The pipe stabber beam 61 is then utilized to telescope the coupling member 86 onto the forward end of the pipeline P as described above in connection with the repair operation. This completed, the pipe stabber frame S with the stabber beam is removed and a second pipe handling frame F-2 with a pipe clamp 18 thereon and carrying a tubular connector member 90 is lowered into place between the forward end of the pipeline and the riser. This pipe clamp is provided with the push-pull cylinders 37 and friction clamps 39 engaging the connector. Once the tubular connector 90 is suitably aligned with the forward end of the pipeline and with the riser, the push-pull cylinders on the pipe clamp are utilized to connect the tubular connector with the coupling members on the pipeline and on the riser, as discussed above.

After any necessary completion work, such as bracing and coating of the connection, the pipe clamps are released and the pipe handling frames removed. The ballast tanks in the frames are preferably blown out prior to removal of the frames to reduce the weight of the frames during handling.

While the methods of operation and utilization of the frames have been described in connection with repair and completion work, it is of course apparent that the apparatus will have many uses for subsea handling and placement of heavy pipes, connectors, structural members and the like.

DESCRIPTION OF THE PREFERRED EMBODIMENTS

Referring now to FIGS. 11 through 19 there are shown in greater detail the preferred structures for the pipe handling frames, hydraulic pipe clamps, stabber beams and other mechanical components of the system.

Referring to FIGS. 11-15, it will be seen that the main load bearing structure of the pipe handling frame has a pair of spaced-apart, rigid inverted U-shaped gantry frames comprising two pairs of legs 47, rigidly connected at their upper ends to cross-header beams 11 and 12 and at their lower ends to bases or sleds 27.

The cross-header members 11 and 12 comprise a plurality of tubular members (illustrated in FIG. 15 and numbered 11 and 11a, as top members, and 12 and 12a, as bottom members), but referred to in the description only as 11 and 12. The cross-header members are interconnected by means of a plurality of reinforcing members 13. Tubular braces 23 extend between the legs 47 and base sleds 27.

Preferably, all of the structural members just described are constructed from tubular steel and contain water-tight compartments which may be ballasted or flooded, through valves 49. Inlet and outlet valves 49 are provided for each ballast compartment, so that the flooded ballasted, compartments may be emptied, or de-ballasted using compressed air to force out the sea water. As it may be desirable to selectively increase or decrease the weight, or buoyancy, of the frame structure, a diver may operate one or more valves 49 to flood or evacuate the structure.

Also, all of the principal structural members are preferably releasably attached by pins 102, or the like, so that the pipe frames can be broken down into its individual structural components for ease of transportation. But when assembled, will be suitably unitary and rigid.

Extending between the pairs of legs 47, but not connected thereto, is a horizontal travel beam 14 on which rests the pipe clamp 18 by way of the clamp sled 15. FIGS. 13 and 14 illustrate the relationship of legs 47 to the travel beam 14. As can be seen, each end of the travel beam 14 is attached to and supported by a hydraulically operated double-acting ram 24, which extends upwardly from foot sled 27, terminating at a point just just short of the top of the legs 47 and being positioned parallel with and between the pair of legs 47.

The travel beam 14 may be raised and lowered by action of the ram 24. Raising and lowering the travel beam 14 permits the pipe clamp 18 to be lowered to a position represented at number 30, representing a pipe, which point is below the plane of the sleds 27. The range of movement possible, for the pipe clamp, is illustrated in FIG. 13 by the representations at members 30, 30a and 31, as well as the position shown in the drawing. These extremities are reached by travel of the pipe clamp 18 horizontally by means of the clamp sled 15, along the horizontal travel beam 14 or vertically by raising or lowering the horizontal travel beam 14. The rams 24 are independently operable to permit the beam 14 to be maintained horizontal even though the base sleds 27 of the frame are at different elevations.

The sled ram 16 is secured at one end thereof to an anchor 48, which is secured to a horizontal travel beam 14. It is preferred that the hydraulic terminals for operating the clamp travel means 15, pipe clamp 18 and clamp jaw rams 22 be connected to and operable through control means 17 affixed to and traveling with clamp sled 15. The hydraulic control line 29 extends to a terminal (not shown).

The horizontal travel beam 14 is guided, in its vertical movement, by guide plates 25 attached to tubular legs 47. The guide plates 25 are positioned facing the inside of the pipe frame assembly and along the axis of the legs 47 from a point at the upper surface of the foot sleds 27 and terminating at a point just above the maximum point of vertical travel of the horizontal travel beam 14. Opposite the guide plates 25 and attached to the horizontal travel beam 14 are guide members 32. Thus, as the horizontal travel beam 14 travels vertically, guide members 32 assist in maintaining alignment of pipe handling structure by traversing the length of the guide plates 25. Load stresses that would tend to misalign the frame are compensated for by the guide plate 25/guide member 32 arrangement.

The pipe clamp 18 is illustrated in FIGS. 13, 16 and 17. In FIG. 13, the pipe clamp 18 is shown closed about pipe 21, with the pipe 21 centered therein, resting on rollers 20, which are attached to clamp jaws 19. In a preferred embodiment, the rollers 20 are replaced with anti-friction means 76, as shown in FIG. 16. This anti-friction means may be any nongripping device or material, such as a polymer. The rollers, inserts, or other anti-friction means permit the pipe to be moved longitudinally of its axis while engaged by the pipe clamp. By utilizing varying sizes of rollers or inserts, the pipe clamp may also be adapted to handle a variety of pipe sizes.

Thus, when there is fully engaged around a pipe the pipe clamp jaws 19, as well as the pipe gripping means or friction clamps 39, the pipe clamp arrangement 18 may be moved along the axis of the pipe 21, or the pipe may be moved longitudinally through the pipe clamp 18, by the push-pull action of the push-pull cylinder 37, which is connected, at one end, to the clamp jaw 19. This connection is by provision of a tongue 42 and groove 43 latching means. The other end of the push-pull cylinder 37 is connected to the gripping means 39. The gripping means or friction clamp 39 is fastened to the pipe 21 so that said friction clamp 39 remains fixed in relation to the pipe 21, until moved by the diver operating the system.

The pipe clamp 18 is connected to the clamp sled 15 by means of a removable latch pin 18-p. The pipe clamp 18 comprises at least two facing, counteracting jaws 19, the jaws being hinged at an upper point by means of a swivel arm 77, the hinged joint being a swivel 34. The swivel arm 77, acts as the upper body of pipe clamp 18 and remains fixed with relation to clamp jaws 19.

The clamp jaws 19 are movable about the swivel 34 by means of hydraulic cylinder 22, providing a means for opening and closing the clamp jaws 19, the cylinder being pivotally connected to the uppermost end of the clamp jaws 19, the connection point being also located on each of a plurality of laterally extending skirts 33, which act as reinforcing means for said jaws 19. The jaws 19, as well as the rams 24 supporting the travel beam 14, are remotely operable by a diver operating controls (not shown) through the hydraulic terminal 17 suitably located on the pipe frame.

As stated above, the pipe clamp 18 is coacts with the friction clamp 39, in certain operation of the present apparatus. The friction clamp 39 is illustrated in greater detail in FIG. 18, wherein there is provided three interconnecting members: the bottom section 39c is shaped to conform to the rounded pipe 21, and has at each end thereof locking means 38 and 38a, to which are connected a "female" clamp member 39b and a "male" clamp member 39a, the "male" member 39a pivoting upon the locking means 38, the "female" member 39b pivoting upon the locking means 38a. The inner surface of each of the friction members is coated with a material 46 that promotes friction and reduces slippage of a pipe through the friction clamp 39.

The ends of each of the "male" 39a and "female" 39b clamp members, opposite the ends thereof which are pivotally locked to the bottom member 39c, have means for retaining a jacking cylinder 44 placed therebetween, which cylinder provides means for reducing the diameter of the enclosed space defined by the interconnected friction members 39a, 39b and 39c. There is further provided, on the "male" 39a and "female" 39b clamp members, means 45 for attaching the push-pull cylinder 37 (and an equivalent cylinder, not shown, on the opposite side of the pipe 21) thereto by means of a swivel connection 40. This connection 40 permits full extension and retraction of the push-pull cylinder 37 by hydraulic forces through line 41 (partially shown on the cylinder 37).

Pipe Stabbing Assembly

In the repair of pipe under water it is useful to provide means for handling the tubular couplings used for connection with the main pipeline. As described above in the method sequence this function is provided for with a pipe stabber assembly or frame which comprises a pipe stabber frame, which may be the same as the pipe handling frame shown overall in FIG. 13, and described hereinabove and a stabber beam 61. However, for use with the stabber beam 61, shown in FIGS. 19, 20 and 21, the pipe clamp 18 is first removed therefrom by removing pin 18-p and the hydraulic lines associated with the pipe clamp.

The stabber beam 61 is mounted on the traveling beam 14 with a stabber sled 57. The clamp sled 15 is connected to the stabber sled 57, preferably by means of a removable connecting plate 56, by means of bolts 58. Movement of the stabber sled 57 along the travel beam 14 is thus accomplished with the same ram 16 and associated controls used to power the pipe sled 15.

The stabber beam 61 is connected to the stabber sled 57 in a hinged relation by suitable means 54, allowing a pivoting about such hinge means 54. The stabber beam 61 extends laterally from the pipe handling frame of FIG. 13, and has mounted thereon a trolley 63 connected to an endless belt or other pulling means 62, allowing movement of the trolley 63 from one end of the stabber beam 61 to the other. A motor 59 housed at one end of the stabber beam drives a pulley 52a. The driven pulley 52a in turn drives the endless belt 62 which passes over the pulley 52a, whence it traverses the inside length of the stabber beam 61 and traverses an opposing pulley 52 at the extreme opposite end of said stabber beam 61.

In order to provide balance and support for the outer end of the stabber beam 61, there is provided a leg and footing means 66, having an inverted-U configuration, the upper end 71 of which may be rested on a pipe repair member 21 being suspended beneath the stabber beam 61 to thereby provide an alignment guide for the stabber beam. If desired, the leg and footing means 66 may be provided with leng-adjusting means 67, locked by securing means 68. In a preferred embodiment, the feet 70 are pivotally connected to legs 66 by means of a pin or bolt 69 arrangement.

If long pieces of pipe, or tubular couplers, are to be used as the repair member, provision can be made for two trolleys 63 to be mounted on the stabber beam 61. The load, carried by the trolleys 63, is carried on load bearing means 64. If desired, a counter-balance means 72 may be employed at a location on the stabber beam in the vicinity of the motor-driven pulley 52a. As illustrated, the counterbalance comprises a chain 72 attached to the stabber beam 61 with its lower end attached to the base of the stabber frame.

The foregoing discussion and description of the invention is illustrative and explanatory thereof only and various changes may be made in the size, shape and materials of construction without departing from the scope of the appended claims and without departing from the spirit of the invention.

What is claimed is:

1. The method of repairing a damaged pipeline on the ocean floor comprising the steps of:
    lowering a first mobile pipe handling frame having a hydraulic pipe clamp thereon into a position over said pipeline and spaced from one side of said damaged portion;
    lowering a second mobile pipe handling frame having a hydraulic pipe clamp thereon into position over said pipeline and spaced from the other side of said damaged portion;
    engaging said hydraulic pipe clamps on said first and second frames about said pipeline on either side of said damaged portion;
    raising said pipe clamps on said first and second pipe handling frames to thereby raise the damaged portion of said pipeline into a working position above the ocean floor;
    removing the damaged portion of said pipeline to thereby leave first and second ends of said pipeline spaced laterally from each other and supported by said first and second pipe handling frames;
    lowering a pipe stabber frame having a stabber beam thereon and a first tubular coupling member releasably attached thereto into the space between the first and second ends of said pipeline;
    aligning said stabber beam and said first coupling member with the longitudinal axis of the said first end of said pipeline;
    actuating said stabber beam to telescope said first coupling member about said first end of said pipeline and thereafter removing said pipe handling frame with said stabber beam thereon;
    lowering a pipe stabber frame with a stabber beam thereon and a second tubular coupling member releasably attached thereto into position between said first and second ends of said pipeline;
    aligning said pipe stabber beam and said second coupling member with the longitudinal axis of said second end of said pipeline;
    actuating said stabber beam to telescope said second coupling member about said second end of said pipeline, and thereafter removing said pipe handling frame with said stabber beam thereon;
    lowering into position between said first and second ends of said pipeline, a third pipe handling frame having a hydraulic clamp thereon with a tubular connector adapted to engage said first and second coupling members releasably carried by said pipe clamp;
    aligning the longitudinal axis of said tubular connector with the longitudinal axes of said first and second ends of said pipeline and said first and second tubular coupling members;
    sealably engaging one end of said tubular connector with said first tubular coupling member and the other end of said connector with said second tubular coupling member; and
    releasing said hydraulic pipe clamps on said pipe handling frame and removing said pipe handling frames from said ocean floor.

2. The method according to claim 1 comprising additionally adjusting the position of at least one of said first and second ends of said pipeline laterally with respect to the longitudinal axis of said pipeline by means of said pipe handling frames to place said first and second ends of said pipeline in axial alignment with each other prior to the installation of said tubular connector.

3. The method of claim 2 wherein the step of adjusting the position of at least one of said first and second ends of said pipeline to thereby place said first and second ends in axial alignment comprises the following sequence:
    (1) lowering said hydraulic pipe clamp relative to said pipe handling frame until said end of said pipeline carried by said clamp is resting on the ocean floor and said pipe handling frame is substantially free of the ocean floor;
    (2) adjusting said pipe clamp laterally relative to said pipe handling frame to thereby cause said pipe handling frame to move laterally in the desired direction relative to the longitudinal axis of said pipeline;
    (3) raising said pipe clamp relative to said pipe handling frame until said pipe handling frame is resting on the ocean floor and the end of said pipeline is substantially clear of the ocean floor;
    (4) adjusting said pipe clamp laterally with respect to said pipe handling frame to thereby cause the end of said pipeline carried by said clamp to move laterally in the desired direction with respect to the longitudinal axis of said pipeline; and (5) repeating steps (1) through (4) until said end of said pipeline is in the desired position.

4. The method of connecting a pipeline on the ocean floor to a marine riser extending upwardly from the ocean floor comprising the steps of:
- lowering a mobile pipe handling frame having a hydraulic clamp thereon into a position over said pipeline, resting on the ocean floor and spaced rearwardly from the forward end of said pipeline;
- engaging said pipe clamp about said pipeline;
- raising said pipe clamp to thereby raise the forward end of said pipeline into a working position above the ocean floor;
- lowering a pipe handling frame having a stabber beam thereon and a tubular coupling member releasably engaged therewith into position on the ocean floor and spaced between the forward end of said pipeline and said riser;
- aligning the longitudinal axis of said stabber beam and said tubular coupling member with the longitudinal axis of the forward end of said pipeline;
- actuating said stabber beam to telescope said coupling member onto the forward end of said pipeline and thereafter removing said pipe handling frame with said stabber beam thereon;
- lowering a second pipe handling frame with a hydraulic clamp thereon and having a tubular connector member releasably engaged in said pipe clamp into position between said forward end of said pipeline and the lower end of said riser;
- actuating said pipe clamp on said second pipe handling frame to axially align said tubular connector with said lower end of said riser and said forward end of said pipeline;
- sealably engaging said connector member with said riser member and said coupling member on said pipeline; and
- releasing said hydraulic pipe clamps on said first and second pipe handling frames and and removing said pipe handling frames from the ocean floor.

5. The method according to claim 1 wherein said pipe handling frames have ballast tanks which may be selectively flooded with seawater and comprising additionally the steps of:
- de-ballasting at least one of said pipe frames prior to lowering it onto the ocean floor;
- thereafter taking on ballast to increase the weight of said pipe frame, and;
- de-ballasting said pipe frame prior to its removal from the ocean floor.

6. A subsea pipe handling frame comprising:
- a pair of vertical legs spaced apart so as to accommodate between them a pipe to be handled;
- a cross-header beam extending between and rigidly attached to the upper ends of said legs;
- support means for supporting the lower end of each of said legs on the ocean floor on opposite sides of the pipe to be handled;
- a horizontal traveling beam extending between said legs, parallel to said cross-header beam and adjustable vertically of said legs;
- hydraulic power means for adjusting said horizontal traveling beam vertically relative to said legs;
- pipe clamp support means carried by said traveling beam and adjustably horizontally thereof;
- hydraulic power means for moving said pipe clamp support means horizontally along said horizontal traveling beam between said legs;
- pipe clamp means carried by said pipe clamp support means and having movable jaws adapted to selectively grip the outside of a pipe being handled;
- said pipe clamp means, carried by pipe clamp support means, being movable horizontally between the pair of legs of the pipe handling frame, and vertically to a position below said support means to engage a pipe lying below the plane of said support means;
- hydraulic power means for actuating the jaws of said pipe clamp means;
- whereby said pipe clamp means may be positioned as desired vertically and horizontally between the legs of said pipe handling frame and the jaws of said pipe clamp means may be actuated to selectively grip and release a pipe being handled.

7. The apparatus according to claim 6 including additional guide means for guiding said horizontal traveling beam vertically relative to said legs.

8. The apparatus according to claim 6 wherein said hydraulic pipe clamp means includes friction reducing means on the inside of said jaws for reducing the friction between said jaws of said pipe clamp means and a pipe being held thereby, whereby a pipe held by said pipe clamp means may be moved longitudinally therethrough.

9. The apparatus according to claim 8 wherein said low friction means comprises rollers.

10. The apparatus according to claim 8 wherein said low friction means comprise inserts of a material having a lower coefficient of friction than the material of said pipe clamp means.

11. The apparatus according to claim 6 wherein said pipe clamp means includes means for accomodating varying sizes of pipe therein.

12. The apparatus according to claim 11 wherein said adjustment means comprise rollers carried by said pipe clamp means.

13. The apparatus according to claim 11 wherein said adjustment means comprise inserts carried by said pipe clamp means.

14. The apparatus according to claim 6 wherein said hydraulic power means for adjusting said horizontal traveling beam vertically relative to said legs comprise a pair of independently adjustable hydraulic rams, one ram supporting each end of said horizontal traveling beam, whereby said horizontal traveling beam amy be selectively included relative to the remainder of said pipe handling frame to thereby maintain said horizontal traveling beam approximately horizontal while said pipe handling frame is inclined.

15. The apparatus according to claim 6 wherein said pipe frame includes ballast tank means which may be selectively ballasted and de-ballasted to adjust the weight of said pipe frame in water.

16. The apparatus according to claim 15 wherein structural members comprising said legs, cross-header beam and base comprise hollow tubular members and said ballast tank means are contained with said hollow tubular members.

17. A subsea pipe handling frame comprising:
- a pair of vertical legs spaced apart so as to accommodate between them a pipe to be handled;
- a cross-header beam extending between and rigidly attached to the upper ends of said legs;
- support means for supporting the lower end of each of said legs on the ocean floor on opposite sides of the pipe to be handled;

a horizontal traveling beam extending between said legs, parallel to said cross-header beam and adjustable vertically of said legs;

hydraulic power means for adjusting said horizontal traveling beam vertically relative to said legs;

pipe clamp support means carried by said traveling beam and adjustable horizontally thereof;

hydraulic power means for moving said pipe clamp support means horizontally along said horizontal traveling beam between said legs;

pipe clamp means carried by said pipe clamp support means and having movable jaws adapted to selectively grip the outside of a pipe being handled;

said pipe clamp means includes friction reducing means on the inside of said jaws for reducing the friction between said jaws of said pipe clamp means and a pipe being held thereby, whereby a pipe held by said pipe clamp means may be moved longitudinally therethrough;

said pipe clamp means, carried by pipe clamp support means, being movable horizontally between the pair of legs of the pipe handling frame, and vertically to a position below said support means to engage a pipe lying below the plane of said support means;

hydraulic power means for actuating the jaws of said pipe clamp means; and friction clamp means, spaced apart from said pipe clamp means, for frictionally engaging the outside of a pipe being carried by said pipe clamp means and hydraulic power means connecting said friction clamp means to said pipe clamp means for moving said friction clamp means relative to said pipe clamp means to thereby move a pipe carried by said pipe clamp means longitudinally through said pipe clamp means.

18. The apparatus according to claim 17 wherein said friction clamp comprises a plurality of arcuate members, each having an inner friction surface, the members being interconnected to encircle pipe of varying diameter in an essentially non-slipping relation.

* * * * *